May 23, 1933.                L. J. ROKOS                1,910,124
                          HEAD LAMP DIFFUSER
                         Filed Sept. 21, 1931

Leo J. Rokos   INVENTOR
BY Victor J. Evans &co
ATTORNEYS

Patented May 23, 1933

1,910,124

UNITED STATES PATENT OFFICE

LEO J. ROKOS, OF PHILADELPHIA, PENNSYLVANIA

HEAD LAMP DIFFUSER

Application filed September 21, 1931. Serial No. 564,234.

The present invention relates to an improved light diffusing attachment for use in connection with headlamps, and the purpose of the invention is to provide a headlamp having a lens with multiple portions, a central clear transparent portion and an outer peripheral diffused portion, in combination with a confining tubular projector into which the clear transparent portion of the lens engages, the tubular projector having its inner surface darkened, preferably a solid black, thereby preventing any lateral reflection of the light from the lamp, hence causing a substantially cylindrical beam of clear light to be projected forwardly and thereby preventing the clear sharp light from reflecting in the eyes of a driver of an oncoming motor vehicle.

It is obvious that in the usual headlamps the concave reflectors usually impart lateral reflections of the light rays as well as directly forward light rays, and such light rays that are reflected upwardly act to reflect into the eyes of a driver of an oncoming motor vehicle.

Therefore it is another purpose of the present invention to utilize the diffused outter peripheral portion of the lens as a means to avoid the upward reflection of the light rays into the eyes of a driver of an oncoming motor vehicle. This outer diffused peripheral portion is accomplished through the medium of a frosted surface on the lens, and additionally by means of segments carried by the lens holding rim, and which are in turn connected to the forward end of the cylindrical tubular projector, the segments being positioned at intervals, which assist in dimming such light rays as are reflected through the diffused or frosted outer periphery of the lens, allowing such light rays to pass through the openings.

It is to be understood that the particulars herein given are in no way limitative and that while still keeping within the scope of the invention, any desired modification of details and proportions may be made in the constructions of the appliance according to circumstances.

The invention comprises further features and combination of parts to be hereinafter set forth, shown in the drawing and claimed.

In the drawing:—

Figure 1:
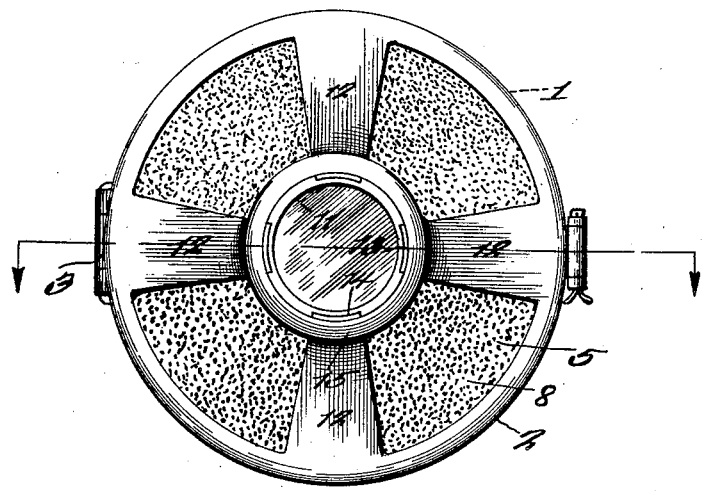
Figure 1 is a view in front elevation of a headlamp showing the improved diffuser attachment applied.
Figure 2:
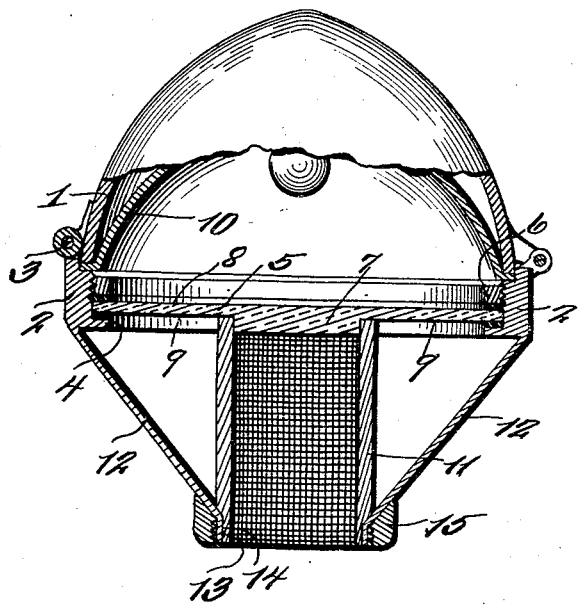
Figure 2 is a sectional view on line 2—2 of Figure 1.

Referring to the drawing 1 identifies a body of a conventional type of headlamp provided with a lens holding rim 2, which is hinged at 3 to the body. This rim has an internal flange 4, against which a lens 5 engages, a ring 6 threaded into the rim acts to hold the lens in position.

The lens 5 has a central circular perfectly plain transparent portion 7, while the outer annulus 8 is frosted as shown at 9, acting to diffuse the lateral light rays, such as may be reflected by the concaved conventional reflector 10.

The central perfectly plain transparent portion 7 of the lens is of a thickness substantially greater than the outer annulus, and extends forwardly into a tubular light ray projector 11, the inner surface of which is darkened substantially black, as indicated, so as to prevent any reflection of lateral light rays. The tubular projector 11 has its axis co-incidental with the axis of the reflector 10, in which case when the headlamp is mounted in the usual manner, namely slightly inclined forwardly and downwardly, a cylindrical column of light rays will be likewise projected forwardly, and as usually slightly downwardly, therefore will not reflect into the eyes of a driver of an oncoming motor vehicle, while the lateral light rays from the usual reflector are diffused substantially by means of the frosted annulus of the lens. The rim 2 is provided with forwardly converging segments 12, the bent ends 13 of which are held seated in recesses 14 by a ring 15, which is threaded on the forward end of the tubular projector 11, thereby not only holding the projector in position against the lens, but also insuring a rigid structure. The segments also act to diffuse the light rays, or rather cover up certain of the diffused light rays penetrating the frosted annulus of the lens.

The invention having been set forth, what is claimed is:

1. In a diffuser for a headlamp, the combination with a headlamp body provided with a lens rim and a lens supported in said rim, said rim having a plurality of segmental members converging forwardly, the front face of the lens having a cylindrical projection of plain transparency, the outer remaining annular portion of the lens being frosted, of a tubular projector engaging the cylindrical projection of the lens and the outer end of the projector engaged between the terminals of the converging segments, and means engaged by the outer end of the tubular projector and over the terminals of the segments to hold the parts together and the tubular projector agains the lens.

2. In a diffuser for a headlamp, a headlamp body provided wih a lens rim and a lens mounted in the rim, the front face of the lens having a cylindrical projection, said cylindrical projection being of clear transparency, while the remaining annulus of the lens is frosted, a tube with one end receiving the cylindrical projection, said rim having a plurality of segments converging forwardly and engaged with the other end of the tube, and means overlying the ends of the segments and clamping the converged ends to the tube, the inner cylindrical surface of the tube being substantially darkened thereby confining the light rays passing through the tube into a cylindrical column.

3. In a diffuser for a headlamp, a headlamp body provided with a lens rim and a lens mounted in the rim, the front face of the lens having a cylindrical projection, said cylindrical projection being of clear transparency, while the remaining annulus of the lens is frosted, a tube with one end receiving the cylindrical projection, said rim having a plurality of segments converging forwardly and engaged with the other end of the tube, and means overlying the ends of the segments and clamping the converged ends of the tube, the inner cylindrical surface of the tube being substantially darkened thereby confining the light rays passing through the tube into a cylindrical column, the outer cylindrical surface at the end of the tube having recesses to receive the terminals of the segments, said means comprising a ring threaded to the tube to insure holding the parts together.

In testimony whereof I affix my signature.

LEO J. ROKOS.